Nov. 10, 1953 R. D. WALLER 2,658,634
SCOOP FOR TRACTORS

Filed Feb. 12, 1948 2 Sheets-Sheet 1

Inventor:
Ralph D. Waller,

By Dawson, Ooms, Brittey Spangenberg,
Attorneys.

Nov. 10, 1953  R. D. WALLER  2,658,634
SCOOP FOR TRACTORS
Filed Feb. 12, 1948  2 Sheets—Sheet 2
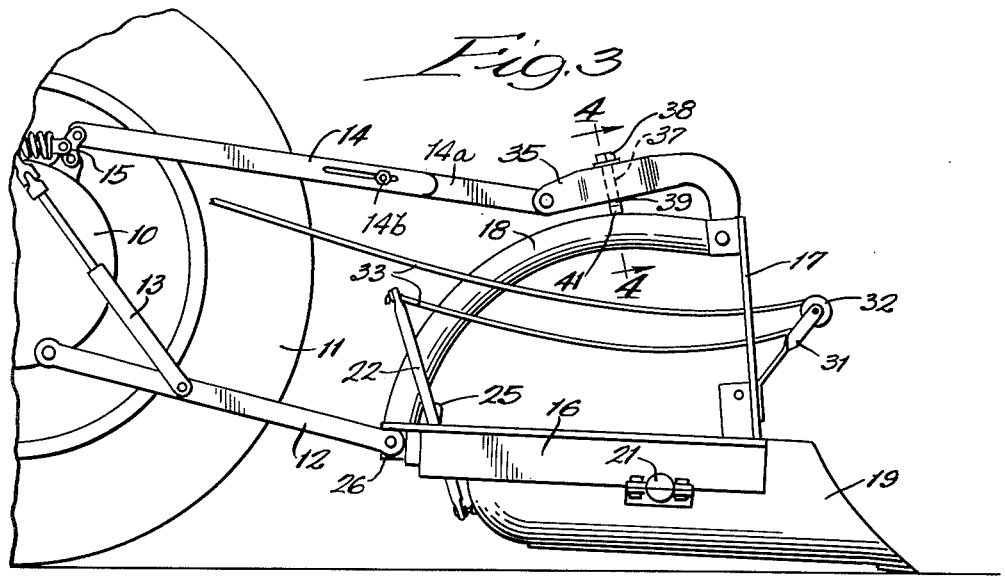
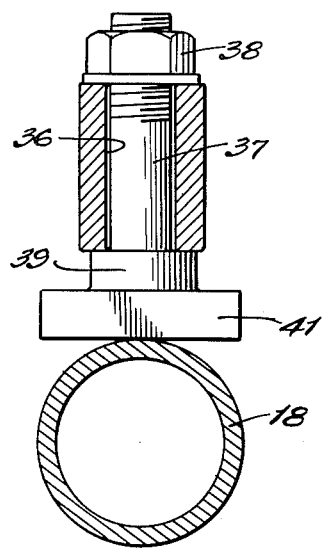
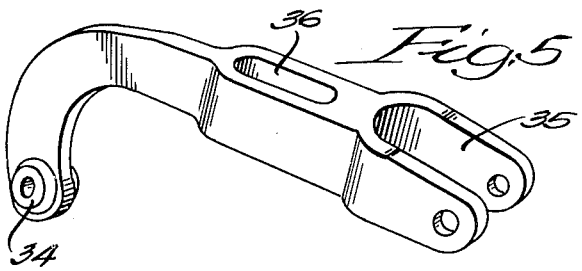
Inventor:
Ralph D. Waller,
By Dawson, Ooms, Booth & Spangenberg,
Attorneys.

Patented Nov. 10, 1953

2,658,634

UNITED STATES PATENT OFFICE 2,658,634

SCOOP FOR TRACTORS

Ralph D. Waller, Macomb, Ill., assignor to Stockland Road Machinery Co., Minneapolis, Minn., a corporation of Minnesota Application February 12, 1948, Serial No. 7,839

4 Claims. (Cl. 214—140)

1

This invention relates to scoops and more particularly to scoops for use on relatively small tractors such as farm tractors.

There is more particularly disclosed and claimed in the patent to Ender, No. 2,350,327, a scoop for use on farm tractors which is extremely satisfactory for most types of digging and material handling operations. This scoop, however, is of the drag type and is not adapted to digging close to walls or to removing materials from a pile.

Ordinarily in performing such operations it is highly desirable that the scoop should face outward from the tractor either at the forward or the rear end thereof. To mount a scoop at the forward end of an ordinary farm tractor requires a special framework which is relatively complicated and expensive and which further eliminates the increased traction which is acquired when the load is maintained at the rear of the tractor.

The present invention provides a scoop mounted at the rear of a tractor and facing rearward therefrom for close digging and for removal of material from piles.

It is one of the objects of the invention to provide a scoop which can be accurately controlled for digging at different levels and which can operate in an upwardly tilted position for removing material from a pile.

Another object is to provide a scoop in which excessive downward tilting is prevented so that the scoop cannot bite into the ground excessively but which can tilt upward for scooping material from the side of a pile.

Still another object is to provide a scoop which can be operated rearwardly at the rear end of a tractor, which can be elevated to carry material, and which can be dumped at any desired level.

A specific object of the invention is to provide a scoop having a pivoted lever at the top of its frame for connection to a tractor top link to form a connection which will collapse in compression but which is inextensible in tension.

The above and other objects and advantages of the invention will be more readily apparent when read in connection with the accompanying drawings, in which—

Figure 3 is a side elevation illustrating a slightly modified scoop construction in digging position;

Figure 4 is a partial enlarged section on the line 4—4 of Figure 3; and

Figure 5 is a perspective view of the top lever of Figure 3.

Figure 1:
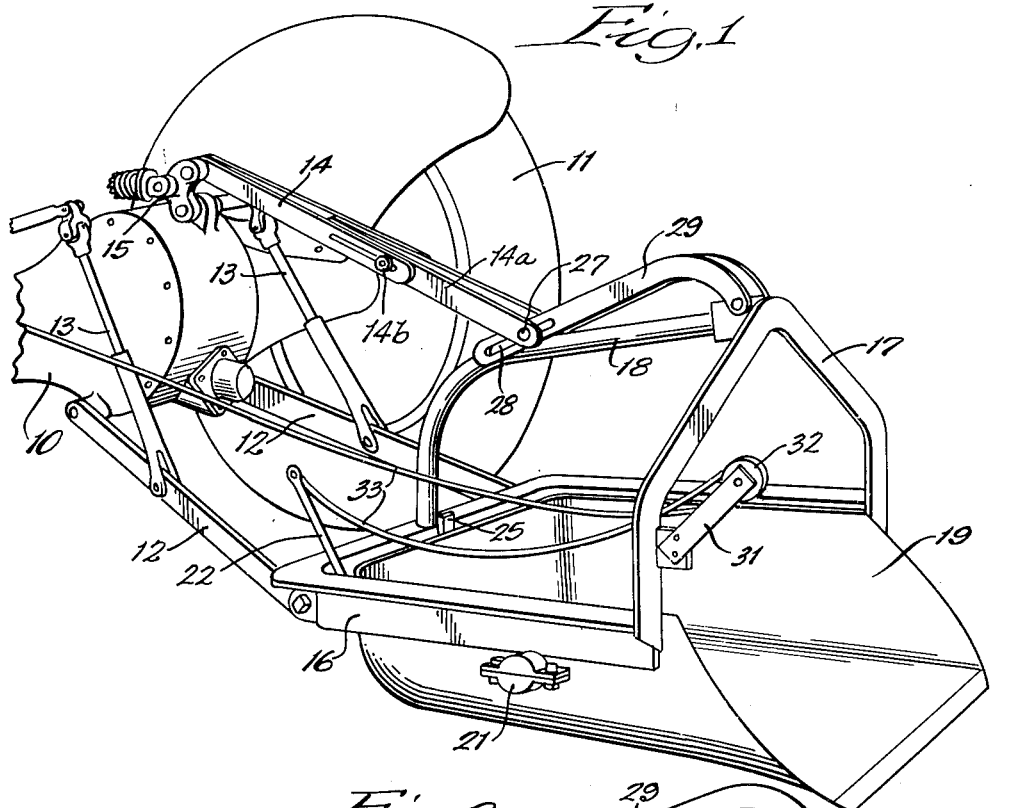
Figure 1 is a partial perspective view of a tractor illustrating a scoop embodying the invention mounted thereon.

The scoop of the present invention may be used with any desired conventional type of tractor which is partially illustrated in Figure 1 as including a rear axle housing 10 on which rear traction wheels 11 are mounted. Drawbar links 12 are pivoted at the lower part of the rear axle housing, as shown, and are adapted to be elevated by means of an elevating linkage 13. At the upper part of the housing there is pivoted a tractor top link 14 which is shown as a double link and which may be adjustable in length. For this purpose the top link is formed of two sections 14 and 14a overlapping and secured together by means of a bolt 14b fitting through slots in the link section so that the effective link length can be adjusted, as desired. The top link is connected at one end to a control lever 15 on the rear axle housing which in the usual tractor functions automatically to control elevation of the drawbar links 12. Since this control mechanism forms no part of the present invention, it will not be further described herein.

While substantially any desired type of scoop unit may be employed, the invention is illustrated in connection with a scoop frame and shell construction of the type described and claimed in Ender Patent No. 2,350,327 referred to above. As shown, this scoop unit includes a frame having a U-shaped lower portion 16 having secured at its open end an upwardly extending yoke 17 whose center point is connected by a curved bar 18 to the central portion of the lower frame. Within the frame so formed there is pivotally mounted a scoop shell 19 with its closed rear end lying adjacent the closed end of the frame 16 and with its open digging end projecting beyond the frame and terminating in a cutting edge. The scoop shell may be pivoted on pivots 21 and is normally held against pivotal movement by a latch mechanism illustrated diagrammatically in Figure 2. As there shown the latch includes a latch operating bar 22 pivoted on a bracket 23 at the rear of the scoop shell and projecting above the shell. The bar is connected to a cross shaft which carries a latch arm 24 adapted to engage a latch finger 25 mounted on the frame 16. To release the latch the arm 22 may be swung toward the open end of the scoop to move the latch finger 24 away from the latch member 25.

According to the present invention the scoop may be mounted at the rear end of the tractor facing outward therefrom. For this purpose the frame 16 is formed at its rear end with pivot mounting connections 26 for pivotal attachment to the rear ends of the drawbar links 12. The upper or top link 14 of the tractor is extended to substantially its maximum length and is adapted to be so connected to the upper part of the frame that it will be inextensible in tension but will shorten under compression so that the scoop may be controlled for level digging at different elevations or may be tilted upward for scooping material from the side of a pile.

Figure 2:
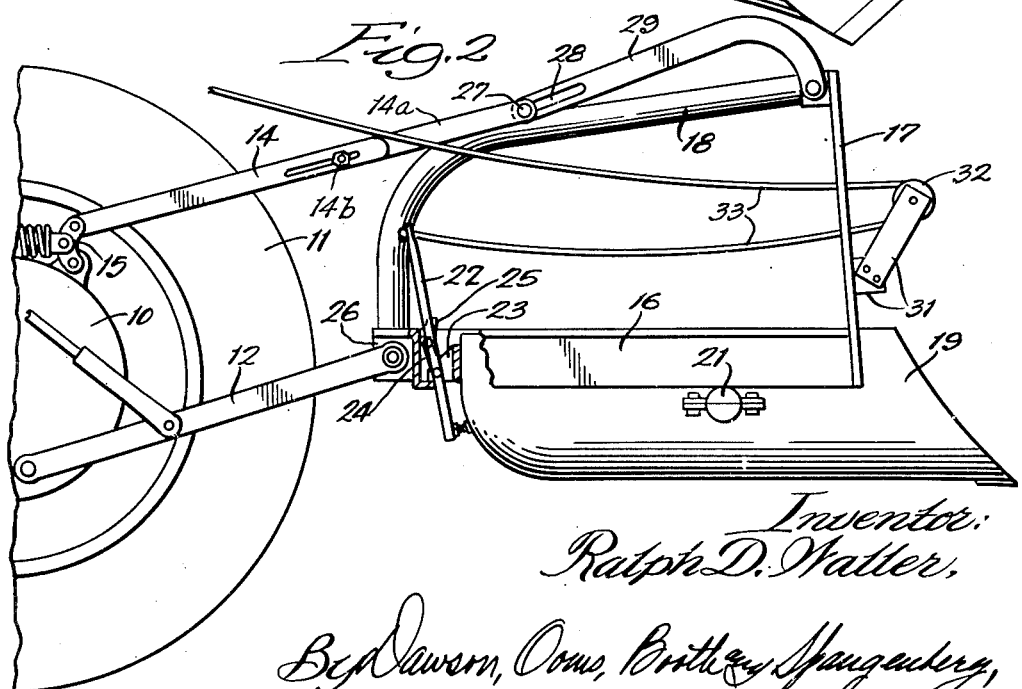
Figure 2 is a side elevation showing the scoop in raised carrying position.

In the construction shown in Figures 1 and 2 the top link 14 carries at its free end a pivot rod 27 which extends through an elongated slot 28 in the free end of a link 29. The other end of the link is pivoted to the top part of the frame adjacent the forward portion thereof. As shown, the link 29 has a pair of spaced arms which normally tend to straddle the frame top bar 18.

For releasing the latch to permit dumping of the scoop shell a bracket 31 is secured to the forward frame portion 17 and carries a pulley 32. A flexible cord 33 may extend from a position adjacent the operator's seat on the tractor over the pulley 32 and may be secured to the upper end of the latch operating lever 22. When the cord is pulled, the latch operating lever will be swung forward to release the latch and to urge the scoop shell to tilt forward to dump material carried thereby.

The parts are shown in Figure 1 with the scoop lowered and tilted upward slightly about its cutting edge or clockwise as seen in Figures 1 and 2 in the position it might occupy in scooping material from the lower part of a pile. When the scoop is lowered to this position the forward edge thereof will first strike the pile and will tend to rock the scoop downward about its cutting edge or counterclockwise. This operation is permitted due to the lost motion connection between the tractor top link 14 and the link 29. If the tractor is then backed toward the pile, the scoop will move up the side of the pile in a downward or counterclockwise tilted position to scoop or dig material therefrom. It will be noted that at this time a horizontal line of force passing through the cutting edge of the scoop shell passes above the pivot 26 so that the scoop tends to tilt downward about its cutting edge or counterclockwise to the extent permitted by the lost motion connection between the links 14 and 29 and until further tilting is limited by the engagement of the scoop bottom with the pile. If greater tilting is desired than that permitted by the lost motion connection, link 29 can be swung upward so that the top link and link 29 will buckle upward to permit substantially unlimited tilting of the scoop. When the scoop is filled it may be raised by elevating the drawbar links 12. When this is done the scoop will tilt to a substantially level position, as shown in Figure 2, in which it will be held by the top link 14 and link 29 which are then placed in tension. In this position of the parts the scoop may be transferred to any desired point and may be dumped.

In normal level digging the parts will occupy substantially the position shown in Figure 2 except that the scoop will be at a lower level. In this operation the digging resistance on the cutting edge of the scoop creates a horizontal line of force passing below the pivot 26 and tends to tilt the scoop upward about its cutting edge or clockwise as shown to the extent permitted by the top link and the link 29. At this time the link 29 is in tension and tends to swing downward but its downward swinging is limited by engagement of the pivot pin 27 with the frame top bar 18 so that it is held in proper digging position.

Figures 3 to 5 illustrate a slight modification of the construction of Figures 1 and 2, parts therein which are identical to like parts in Figures 1 and 2 being indicated by the same reference numerals. In this construction all of the parts are identical with those of Figures 1 and 2 except the link 29. In Figures 3 to 5 this link is formed as an integral forging or casting having its forward end curved downwardly and formed with a pivot mounting 34 for pivotal connection to the tractor frame. The rear end of the link is forked, as shown at 35, for straight pivotal connection to the tractor top link 14 and the link is formed intermediate its ends with a vertical slot 36. A stop member as best shown in Figure 4 is adapted to fit in the slot 36 and comprises a threaded shank portion 37 to extend through the slot and to receive a nut 38 at its upper end. The lower end of the shank terminates in an enlarged head 39 which will engage the link at the sides of the slot and which carries a crossbar 41 to engage the scoop frame 18. By adjusting the stop member along the slot 36 it is possible to adjust the maximum downward position of the link thereby to adjust the digging angle of the scoop.

As shown in Figure 3 the parts are in the normal digging position in which the scoop is tilted slightly upward about its cutting edge or clockwise so that its edge will tend to bite into the ground. The digging operation tends to tilt the scoop clockwise as shown but its tilting is limited by the top link 14 and the link so that it is held in proper digging position. It will be noted that at this time the stop bar 41 is held in engagement with the frame top piece 18 to limit downward swinging of the lever and that adjustment of the position of the lever through adjusting the stop will change the digging angle of the scoop.

At the end of a digging operation when the scoop is elevated it will pivot about its connections to the drawbar levers 12 and about the pivotal connection between the top link 14 and the link. Due to the difference in lengths of the drawbar and top link, the scoop will tilt backwards slightly to carry the material more efficiently to the point of dumping.

For digging from a pile or the like the scoop may be lowered as in Figure 1 so that the top link and lever are subjected to compression. At this time the top link and link 35 will buckle upwards to shorten their effective length between the points of connection to the tractor and the scoop frame so that the scoop can tilt downward about its cutting edge or counterclockwise as shown. The scoop can thus be utilized in this position to scoop material from the side of a pile or the like in the same manner as previously described in connection with Figures 1 and 2.

While two embodiments of the invention have been shown and described in detail herein, it will be understood that they are illustrative only and are not to be taken as a definition of the scope of the invention, reference being had for this purpose to the appended claims.

What is claimed is:

1. A scoop adapted to be mounted on a tractor comprising a scoop unit including a vertically extended frame and a scoop shell carried by the lower part of the frame and terminating at one end in a cutting edge, vertically spaced connections on the frame above the level of the cutting edge when the frame and scoop shell are in a normal level digging position, the lower connection formed for pivotal connection to a tractor drawbar with the cutting edge facing outward from the tractor, a link pivoted on the upper connection and lying above the frame for vertical swinging movement and formed at its free end for pivotal connection to a tractor top link, and a part on said link engageable with the frame to limit downward swinging of the link toward the frame to a position in which a horizontal line of force passing through the cutting edge will pass below the lower connection to the scoop frame so that the scoop shell and frame tend to tilt upward about the cutting edge, the link being free to swing upward when it is placed in compression effectively to shorten the top connection to the tractor so that the scoop shell and frame can swing downward about the cutting edge to a position in which a horizontal line of force passing through the cutting edge will pass above the lower connection to the frame.

2. The construction of claim 1 in which the scoop shell is pivoted to the frame, and including a releasable latch normally to hold the scoop shell against tilting on the frame and releasable to permit tilting of the scoop shell to a dumping position.

3. The construction of claim 1 in which the link is formed adjacent to its free end with an elongated slot to provide a lost motion connection with the tractor top link.

4. The construction of claim 1 in which said part is adjustable on the link to vary the limit of downward swinging of the link toward the frame.

RALPH D. WALLER.

References Cited in the file of this patent

UNITED STATES PATENTS

| Number | Name | Date |
|---|---|---|
| 2,254,292 | Jones | Sept. 2, 1941 |
| 2,273,875 | Livesey et al. | Feb. 24, 1942 |
| 2,311,671 | Larsen | Feb. 23, 1943 |
| 2,326,197 | Blecha | Aug. 10, 1943 |
| 2,330,847 | Seal | Oct. 5, 1943 |
| 2,350,327 | Ender | June 6, 1944 |
| 2,398,585 | Hayward | Apr. 16, 1946 |
| 2,427,575 | Sedore | Sept. 16, 1947 |
| 2,449,212 | Fraga | Sept. 14, 1948 |
| 2,464,224 | Grabert | Mar. 15, 1949 |
| 2,517,163 | Arps | Aug. 1, 1950 |
| 2,548,461 | Arps | Apr. 10, 1951 |